(12) United States Patent
Einsle et al.

(10) Patent No.: US 6,193,824 B1
(45) Date of Patent: Feb. 27, 2001

(54) METHOD OF INSTALLING AN OPTICAL WAVEGUIDE CABLE ON A CONDUCTOR OF A HIGH-VOLTAGE OVERHEAD LINE

(75) Inventors: Günter Einsle, Müchen; Ernst Mayr, Starnberg, both of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 08/973,011
(22) PCT Filed: May 31, 1996
(86) PCT No.: PCT/DE96/00958
  § 371 Date: Nov. 25, 1997
  § 102(e) Date: Nov. 25, 1997
(87) PCT Pub. No.: WO96/38892
  PCT Pub. Date: Dec. 5, 1996

(30) Foreign Application Priority Data

Jun. 2, 1995 (DE) .............................................. 195 20 382
Apr. 12, 1996 (DE) .............................................. 1961450930

(51) Int. Cl.⁷ ...................................................... B32B 31/00
(52) U.S. Cl. ........................................... 156/53; 156/195
(58) Field of Search ....................................... 156/53, 195

(56) References Cited

U.S. PATENT DOCUMENTS

| 1,235,671 | * | 8/1917 | Fay ........................................... 285/55 |
| 2,669,258 | * | 2/1954 | Spitz ....................................... 138/129 |
| 3,077,068 | * | 2/1963 | Miller ........................................ 57/15 |
| 3,362,861 | * | 1/1968 | Barker et al. ........................... 156/53 |
| 3,474,183 |   | 10/1969 | Kelly, Jr. et al. . |
| 3,616,123 | * | 10/1971 | Reynolds et al. ..................... 428/222 |
| 3,772,451 |   | 11/1973 | Canavan et al. . |
| 4,262,169 |   | 4/1981 | Lanton, Jr. . |
| 4,268,334 | * | 5/1981 | Harris et al. .......................... 156/187 |

FOREIGN PATENT DOCUMENTS

| 31 06 207 | 9/1982 | (DE) . |
| 32 28 239 | 2/1984 | (DE) . |
| 37 02 781 | 8/1988 | (DE) . |
| 263 838 | 1/1989 | (DE) . |
| 1466033 | 3/1989 | (RU) . |

* cited by examiner

Primary Examiner—Francis J. Lorin
(74) Attorney, Agent, or Firm—Hill & Simpson

(57) ABSTRACT

A method of installing an optical cable on a conductor of a high-voltage line comprises helically wrapping the cable and conductor with an adhesive tape.

22 Claims, 3 Drawing Sheets

METHOD OF INSTALLING AN OPTICAL WAVEGUIDE CABLE ON A CONDUCTOR OF A HIGH-VOLTAGE OVERHEAD LINE

BACKGROUND OF THE INVENTION

The invention relates to a method of installing an optical waveguide cable on a conductor of a high-voltage overhead line with the aid of securing elements applied in a helical manner.

It is currently known that an optical waveguide cable (FIG. 1); is tied to a carrier cable or an earthing or grounding cable 2 of a high-voltage overhead line with the aid of a tying wire 3 applied in a spiral manner. Although in this case only a simple winding machine and an inexpensive tying means are used, disadvantages nevertheless result if the tying means tears or breaks. In the event of such a tear, the spiral springs open and the entire optical waveguide cable falls off along its length. Additionally, difficulties result due to different expansions under changes in temperature, thus possibly causing tensions or constrictions to occur.

A further possibility consists in that the optical waveguide cable (FIG. 2) is; wound spirally around the carrier cable or grounding cable 2. In this case, the application operation is even further simplified since no tying means are required, but only relatively thin optical waveguide cables can be used. Additionally, the receiving capacity for the winding machine is very limited since the full length of optical waveguide cable has to be carried along. Additionally, there is the risk of the wound-on optical waveguide cable migrating in each case to the lowest point in a span due to the garland formation in the high-voltage overhead line. This migration causes additional tensile forces on the masts. It is furthermore known to attach an optical waveguide cable (FIG. 3) to a conductor of the high-voltage overhead line or to the grounding cable 2 with the aid of clips or straps 4. In this case, however, it is disadvantageous that a very expensive installation machine with complicated mechanisms has to be used, this machine and the corresponding holding elements respectively having to be matched precisely to the cable diameter.

Methods of this type are known from the German Offenlegungsschrift 31 06 207 and the German Patent Specification 32 28 239.

SUMMARY OF THE INVENTION

The object of the invention is to find a simple method for installing an optical waveguide cable on a conductor of a high-voltage overhead line, in which, in the simplest attachment method by winding on a securing element, a safeguard against coming off in the event of a rupture of a securing element is provided. The object is achieved with a method of the type explained at the beginning, in that the optical waveguide cable fitted on along a conductor of the high-voltage overhead line is attached with the aid of at least one adhesive tape. The adhesive tape is wrapped helically around the conductor and the optical waveguide cable with its adhesive side facing inwards by means of a winding machine.

The advantages of the method according to the invention can be seen in the fact that an optical waveguide cable can be fitted on in a conventional, simple manner along an existing conductor of a high-voltage line, and that it can then be secured with the aid of an equally simple winding machine by means of an adhesive tape wrapped helically around the conductor and the optical waveguide cable. It is guaranteed by the adhesion of the adhesive tape on the conductor/optical waveguide cable unit that good fixing is brought about so that equal securing conductions prevail over the entire length of the span. It is furthermore ensured that, even in the event of a possible rupture of a securing element occurring, there will be no detachment of the optical waveguide cable since the firm adhesive bonding between the conductor and the optical waveguide cable remains intact before and after the rupture. A particularly secure attachment results if, for example, two adhesive tapes are applied with crossover wrapping since, in this case, there is then a further defined bonding between the two adhesive tapes additionally at the adhesive tape crossover points. Additionally, it is advantageous that, in arrangements of this type, almost any customary cable diameter combination is possible, and that no constrictions occur, which may be the case when using winding wires.

Materials considered possible for the preferably dielectric, i.e. insulating adhesive tapes are, for example, in particular the following:

Fluoropolymer films (e.g. Teflon) coated with silicone adhesive made by Beiersdorf.

Polyvinyl fluoride films (PVF), for example coated with acrylate adhesive made by 3M-Scotch.

Polyester films.

Reinforcements, e.g. made of glass fibres or aramide fibres ("Kevlar") may also be provided in the films. It is also possible to use a mixture of reinforcements, e.g. combinations of glass fibres and aramide fibres. It is also possible to improve the tensile strength by using fabric tapes, which are made of aramide fibres and/or of glass fibres. The thread-like or fabric-like reinforcements can be impregnated with a liquid adhesive material in a simple manner, and thus produces the finished adhesive tape. For example, aramide or glass-fabric tapes may be provided with silicone adhesive made by Beiersdorf.

The adhesive tape described above is subjected to considerable mechanical loading during operation. A further development of the invention is therefore based on the object of specifying a way in which the mechanical properties of the adhesive tape can be improved in a simple manner. This object is achieved in that an adhesive tape is applied, which additionally has at least one reinforcing layer.

The reinforcing layer improves the mechanical properties to the desired and necessary extent. The application of this reinforcing layer expediently takes place retrospectively, i.e. it is applied to the finished adhesive tape in a further operation. In a particularly expedient manner, the reinforcing layer is applied to the adhesive layer of the adhesive tape, and thus produces simple positional securing. Furthermore, commercially available and therefore cost-effective adhesive tapes can be used as starting materials, which merely have to be provided with the reinforcing layer for the specific requirements of the attachment of an optical cable.

The invention furthermore relates to a high-voltage overhead line, having an optical cable attached to at least one overhead conductor, which is characterized in that the optical cable is held on the conductor by attaching it by means of at least one adhesive tape.

DESCRIPTION OF THE PREFERRED EMBODIMENT

Figure 1:
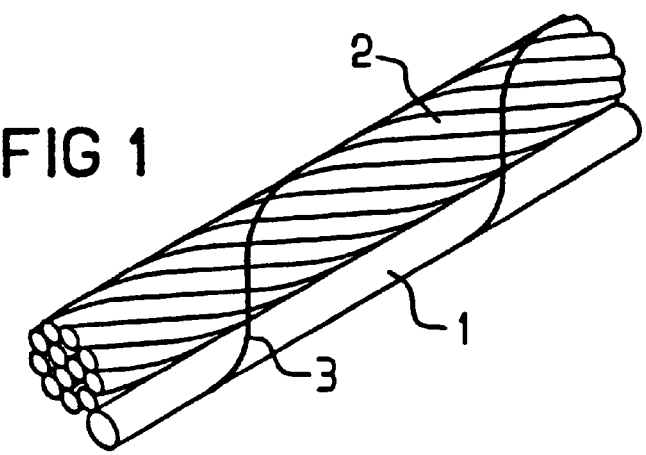
FIG. 1 a perspective view of a prior art method in which a tying wire is used.
Figure 2:
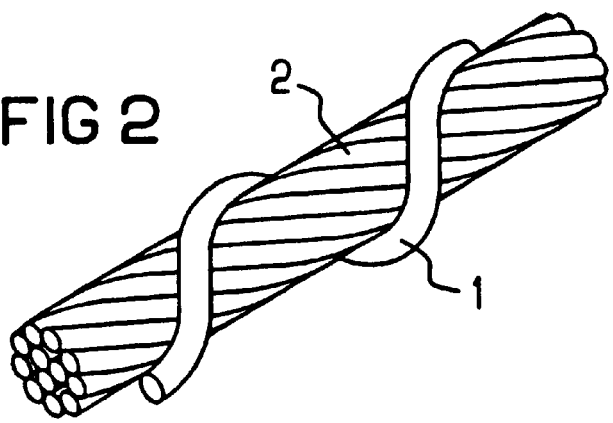
FIG. 2 is a perspective view of a prior art method in which the optical waveguide cable itself is wrapped around the conductor.
Figure 3:
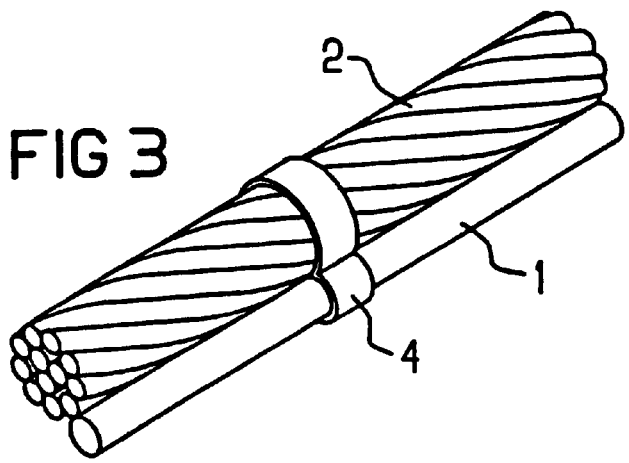
FIG. 3 is a perspective view of a prior art method in which the securing of the optical waveguide cable is carried out with the aid of individual securing elements.
Figure 4:
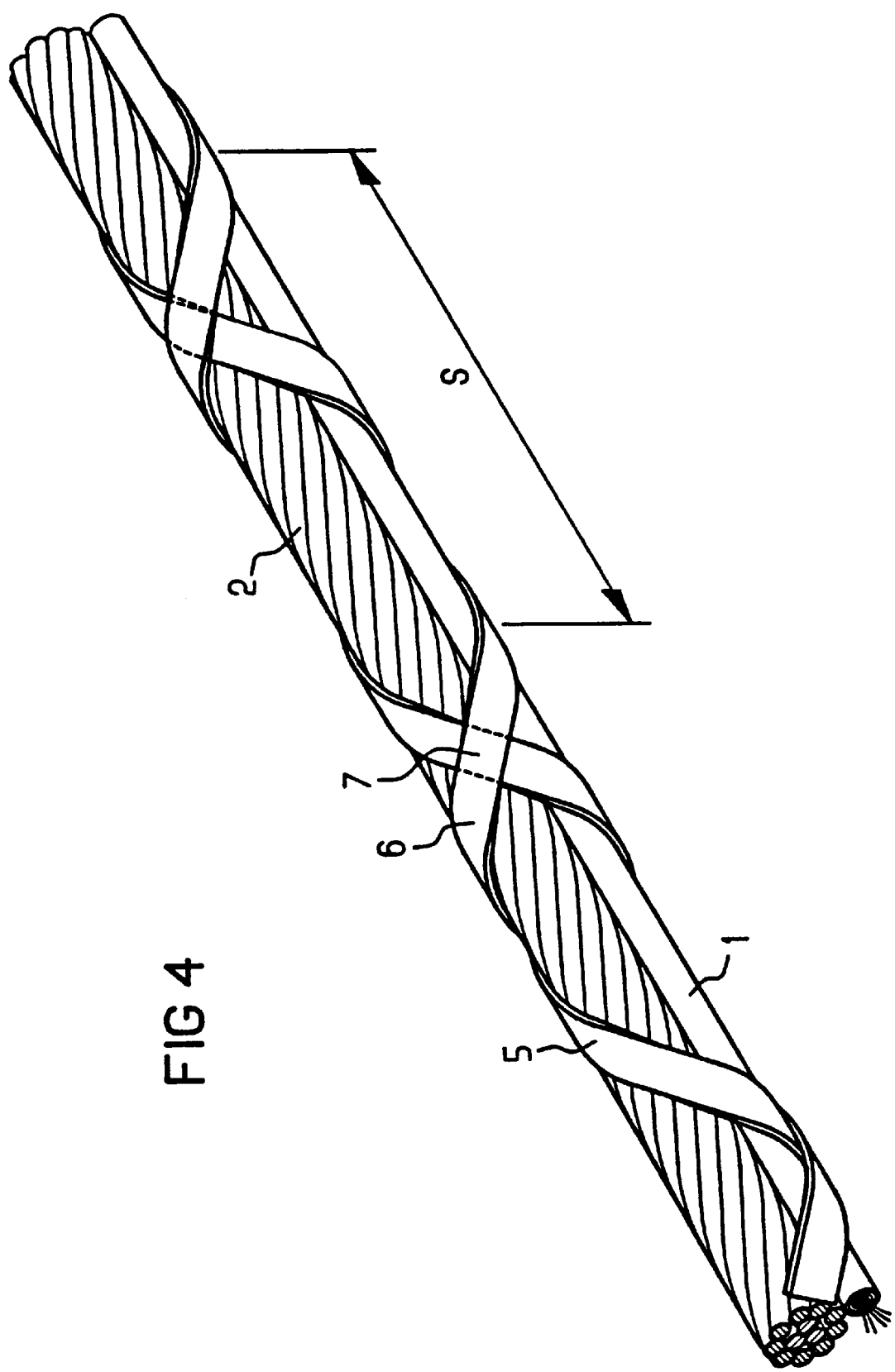
FIG. 4 is a perspective view of an arrangement which is produced by the method according to the invention.

FIG. 4 illustrates the arrangement between the conductor 2 (grounding or phase cable) of a high-voltage overhead line and an optical waveguide cable 1 attached by means of adhesive tapes 5 and 6, which arrangement was produced by the method according to the invention. After the optical waveguide cable 1 to be attached has been fitted on and along a conductor 2, preferably a grounding cable, of a high-voltage overhead line, it is attached with the aid of at least one adhesive tape 5 or 6 or even a pair of tapes 5 and 6. It is possible for this operation to be carried out using a winding machine which is known per se. In this case, the adhesive sides of the adhesive tapes 5 and 6 face the conductor 2 and the optical waveguide cable 1 so that the two are thus fixed relative to one another. It has proved to be advantageous for the length of lay or wrapping length S for applying an adhesive tape 5 or 6 to be between 250 mm and 500 mm.

It is furthermore illustrated in this figure that a second adhesive tape 6 is wrapped around helically, the latter extending, together with the first tape, with crossover wrapping so that, in addition to the adhesion with the conductor 2 and the optical waveguide cable 1, a defined bonding results between the two adhesive tapes 5 and 6 at the tape crossover points 7. This results in additional fixing of the entire unit, particularly also if a rupture or tear should occur in one of the adhesive tapes 5 or 6.

Figure 5:
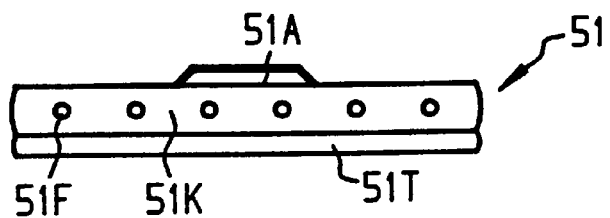
FIG. 5 is an end view of an improved adhesive tape.

In FIG. 5, an adhesive tape is denoted by 51, and the adhesive tape preferably consists of threads or a tear-resistant fabric which is indicated diagrammatically by individual threads 51F. This fabric already results in a high tensile strength and is impregnated with an adhesive 51K so that a self-adhesive tape 51 is formed. On the side not used for bonding, a film-like covering 51T is expediently applied so that the wound-up tape 51 can be easily unwound. To illustrate this, far more adhesive material than is necessary is illustrated in the drawing; and in reality, it is usually sufficient to impregnate the threads or the fabric 51F with the adhesive material.

On the adhesive (free) side, and thus the side facing the optical cable, at least one reinforcing layer 51A is provided and advantageously consists of a multiplicity of thin threads, rovings or a fabric of very high tensile strength. Aramide filaments whose tensile strength is correspondingly high are preferably used for this purpose. Expressed in general terms, the tensile strength of the material used for the layer 51A should be selected to be greater than that of the adhesive tape, preferably by at least three to fivefold.

The reinforcing layer 51A is advantageously applied flatly, for example due to the fact that the reinforcing layer consists of a plurality of threads which are correspondingly pressed flat. The reinforcing layer 51A should expediently cover only a part, preferably between 10 and 70%, in particular between 10% and 20%, of the adhesive surface (broad side) of the adhesive tape. The reinforcing layer 51A is advantageously applied approximately centrally, i.e. symmetrically on the adhesive side of the tape 51. The width of the tape 51 is expediently selected to be between 5 and 12 mm, and preferably between 6 and 8 mm. The thickness of the tape 51 advantageously lies between 0.05 and 1 mm, with the preferred values lying between 0.1 and 0.2 mm.

Figure 6:
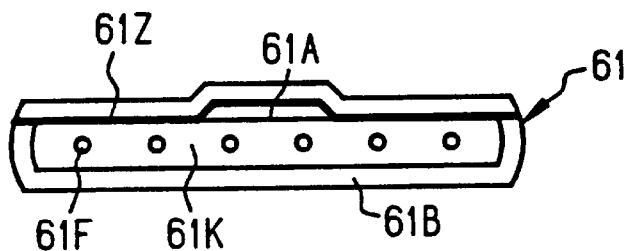
FIG. 6 is an end view of a modification of an improved adhesive tape.

In many cases, it may be expedient to provide the adhesive tape with an additional coating to protect it better, in particular to improve the resistance to UV light. An example of this is illustrated in FIG. 6, where an adhesive tape 61 is provided on the outside with a bitumen layer 61B. This adhesive tape 61 is expediently made up analogously to the adhesive tape according to FIG. 5, i.e. it has on the inside a fabric (indicated by the threads 61F) which is impregnated with an adhesive material 61K. The bitumen layer 61B expediently surrounds the adhesive tape 61 on all sides and also covers the reinforcing layer 61A which may be present. In order to guarantee the bonding capacity of the adhesive tape 61 despite the bitumen coating, an intermediate layer 61Z in the form of a thin film, which lies between the adhesive layer 61K and the bitumen layer 61B, is applied to the side which is later to be applied to the optical cable and to the conductor. Directly before the optical cable is attached, this intermediate layer 61Z is removed and the adhesive surface on the upper side of the adhesive tape 61 is thus exposed. The structure thus obtained for attachment then resembles that of FIG. 5 with the only difference that the bitumen layer 61B is still present on the underside (i.e. on the outer side in the operating state) of the adhesive tape 61. The adhesive tape 51 or 61 is expediently made up to be non-conductive (fully dielectric).

Aramide threads, in particular aramide yarns and/or glass filaments, possibly also in the form of rovings, are used for the threads or the fabric 51F in FIG. 5 or 61f in FIG. 6.

The adhesive materials corresponding to the reference numerals 51K and 61K should expediently consist of UV-resistant adhesives, in particular those which remain permanently elastic and do not harden or become brittle even at relatively low temperatures. Polyisobutylene is preferably used as the adhesive (e.g. "Oppanol").

Figure 7:
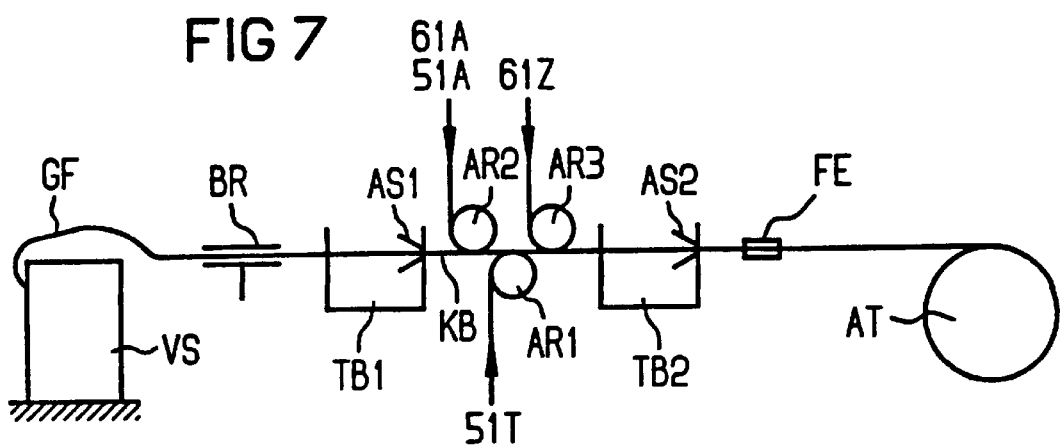
FIG. 7 is a diagrammatic view of a production line for the manufacture of an adhesive tape according to FIGS. 5 and 6.

FIG. 7 shows an apparatus for the manufacture of a tape according to either FIG. 5 or 6, the thread-like or fabric-like material GF is drawn off a supply reel VS, which material forms the insert 51F or 61F of high tensile strength of the adhesive tape, e.g. 51 or 61. This material of high tensile strength runs through a braking apparatus BR and subsequently through an impregnating bath TB1 in which it is impregnated with the adhesive material. Provided at the exit of the bath TB1 is a stripping and possibly forming apparatus AS1 in order to retain excess adhesive material in the bath TB1 and possibly (when individual threads are used) to give the tape the desired structure. After sufficient drying (e.g. by means of hot air or the like), the adhesive tape KB arrives at a nipping roller AR1 by means of which the protective film 51T according to FIG. 5 is applied. The reinforcing layer 51A or 61A is applied to the other side of the adhesive tape KB by means of a nipping roller AR2. The adhesive tape thus obtained can be wound onto a drum AT.

If bitumen impregnation is to be carried out, the additional protective film 61Z (cf. FIG. 6) is applied by means of a nipping roller AR3. The adhesive tape KB then also runs through a second impregnating basin TB2 in which a liquid bitumen is provided. The outer bitumen layer 61B illustrated in FIG. 6 can thus be applied. Excess bitumen material is stripped off by means of a further stripper AS2, and the adhesive tape possibly receives its final shape by means of a subsequent forming apparatus FE. The adhesive tape thus obtained in wound onto the winding drum AT.

Instead of a bitumen coating, any other protective material can also be applied (e.g. protective lacquer or the like).

What is claimed is:

1. Method of installing an optical waveguide cable on a conductor of a high-voltage overhead line with the aid of securing elements applied in a helical manner, the method comprising the steps of providing the conductor of the high-voltage overhead line; positioning and attaching the optical waveguide cable to the conductor of a high-voltage overhead line with the aid of at least one adhesive tape by wrapping the adhesive tape helically around the conductor and the optical waveguide cable with an adhesive side of the tape facing inward.

2. Method according to claim 1, wherein the adhesive tape is a self-adhesive tape.

3. Method according to claim 1, wherein the adhesive tape has a film selected from a fluoropolymer film and a polyvinyl fluoride film.

4. Method according to claim 1, wherein the adhesive tape is coated with an adhesive selected from an acrylate adhesive and a silicone adhesive.

5. Method according to claim 1, wherein the adhesive tape has reinforcements selected from glass-fibre and aramide-fibre reinforcements.

6. Method according to claim 1, wherein the adhesive tape is a fabric tape with a coating of adhesive material.

7. Method according to claim 1, wherein the step of wrapping helically wraps two adhesive tapes with crossover wrappings.

8. Method according to claim 1, wherein the step of wrapping helically wraps the adhesive tape with a wrapping length of between 250 to 500 mm.

9. Method according to claim 1, wherein the step of attaching the optical waveguide cable attaches the waveguide cable to the grounding conductor of a high-voltage overhead line.

10. Method according to claim 1, wherein the adhesive tape has at least one reinforcing layer.

11. Method according to claim 10, wherein the reinforcing layer is selected from a group consisting of a plurality of threads and a fabric.

12. Method according to claim 10, wherein the reinforcing layer has a tensile strength which is greater than that of the actual adhesive tape.

13. Method according to claim 10, wherein the reinforcing layer covers only between 10 and 70% of the broad side of the adhesive tape.

14. Method according to claim 10, wherein the reinforcing layer consists of rovings.

15. Method according to claim 10, wherein the reinforcing layer is applied approximately centrally to the broad side of the tape.

16. Method according to claim 1, wherein the adhesive tape has a protective layer selected from a group consisting of a bitumen layer and a protective lacquer.

17. Method according to claim 1, wherein the adhesive tape is impregnated with a permanently elastic adhesive.

18. Method according to claim 1, wherein the adhesive tape has a reinforcing layer on a surface facing the optical cable.

19. Method according to claim 1, wherein the adhesive tape has polyisobutylene as the adhesive.

20. Method according to claim 1, wherein the adhesive tape has a width between 5 and 12 mm.

21. Method according to claim 1, wherein the adhesive tape has a thickness between 0.05 and 1 mm.

22. A high voltage overhead line comprising at least one conductor, an optical cable extending along said one conductor and at least one adhesive tape wrapped around the optical cable and the one conductor to hold the cable on the one conductor.

* * * * *